United States Patent [19]

Kent

[11] 4,129,116
[45] Dec. 12, 1978

[54] SOLAR AIR FLOW CONTROLLER AND SYSTEM

[75] Inventor: Thomas B. Kent, Boulder, Colo.

[73] Assignee: Solar Control Corporation, Boulder, Colo.

[21] Appl. No.: 735,096

[22] Filed: Oct. 22, 1976

[51] Int. Cl.² .............................................. F24J 3/02
[52] U.S. Cl. .................................... 126/270; 98/33 A
[58] Field of Search .................. 126/270, 271, 400; 237/1 A, 46, 50; 98/38 R, 38 A, 38 B, 38 C, 38 D, 38 F, 33 R, 33 A

[56] References Cited

U.S. PATENT DOCUMENTS

| 2,431,726 | 12/1947 | Bechtler | 98/33 A X |
|---|---|---|---|
| 2,469,496 | 5/1949 | Christenson | 237/1 A |
| 3,369,541 | 2/1968 | Thomason | 126/400 |
| 3,412,728 | 11/1968 | Thomason | 126/270 |
| 3,919,998 | 11/1975 | Parker | 126/270 |
| 3,955,555 | 5/1976 | Bostrom | 126/270 |
| 3,983,929 | 10/1976 | Thomason et al. | 126/400 X |
| 3,997,108 | 12/1976 | Mason | 126/270 |
| 4,002,109 | 1/1977 | Hori et al. | 98/33 A |
| 4,029,081 | 6/1977 | Strong | 126/400 X |

*Primary Examiner*—William F. O'Dea
*Assistant Examiner*—Larry Jones

*Attorney, Agent, or Firm*—Sheridan, Ross, Fields & McIntosh

[57] ABSTRACT

An installation for utilizing solar energy for heating air and delivering heated air to a building or the like includes a solar heat collector, a heat storage unit, a blower for producing the desired air flow and ducting connecting the components to permit operation in various modes. A unitary controller is provided in the form of an enclosure containing a blower and having three air flow ports. Ducting extends between the first port and the collector, between the second port and the heat storage unit, between the third port and the building, and between the building, heat storage unit, and collector. Flow control and directing means unitized within the enclosure establish three different air transport loops through the blower for three different heat transfer modes. A first loop connects the blower, storage unit and collector to deliver heat from the collector to the storage unit. A second loop connects the blower, building and collector to deliver heat from the collector to the building. A third loop connects the blower, building and storage unit to deliver heat from the storage unit to the building. The flow control devices and actuators are all located in unitary fashion at the enclosure for simplicity, convenience and reliability.

11 Claims, 7 Drawing Figures

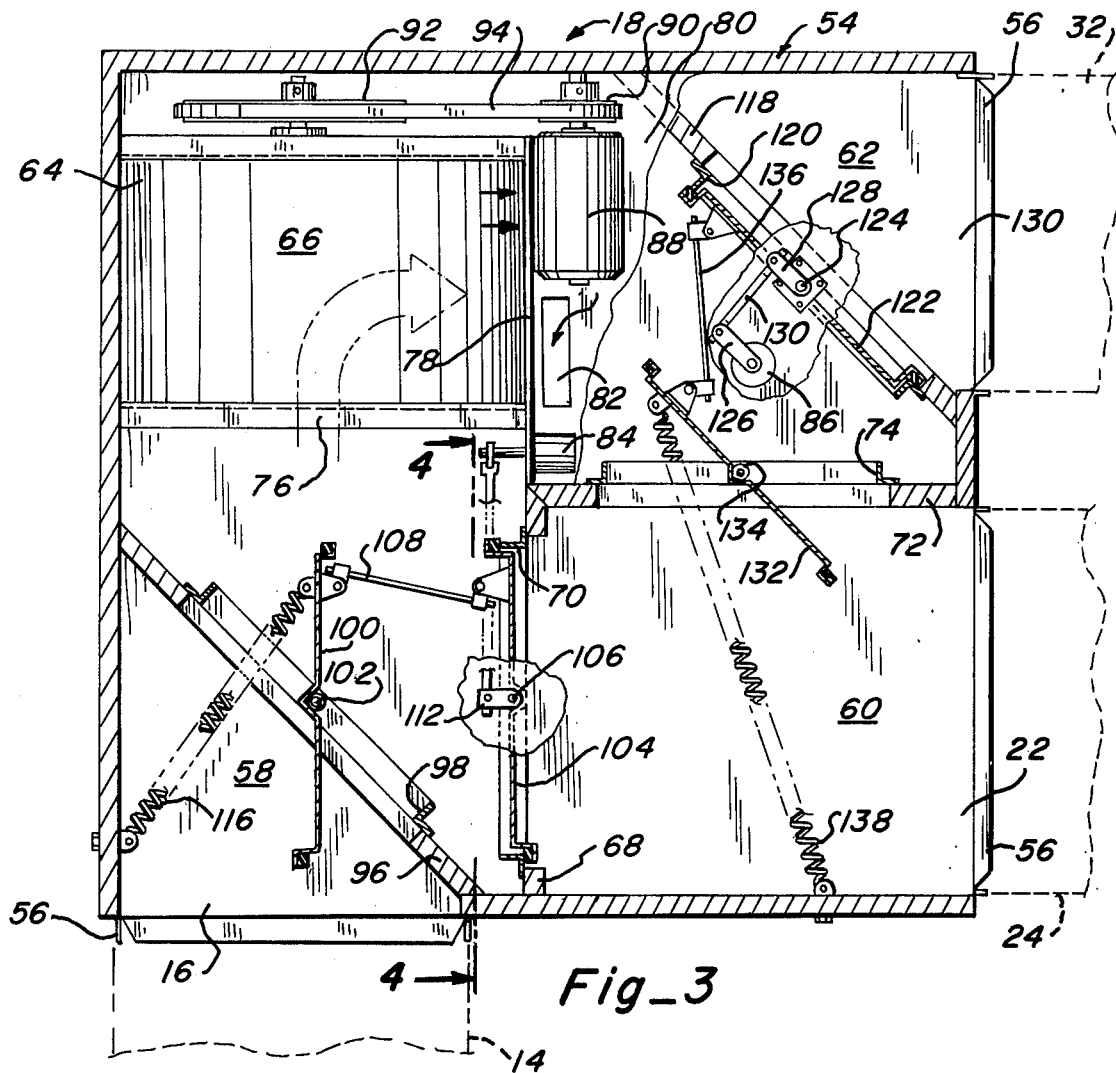
Fig_3
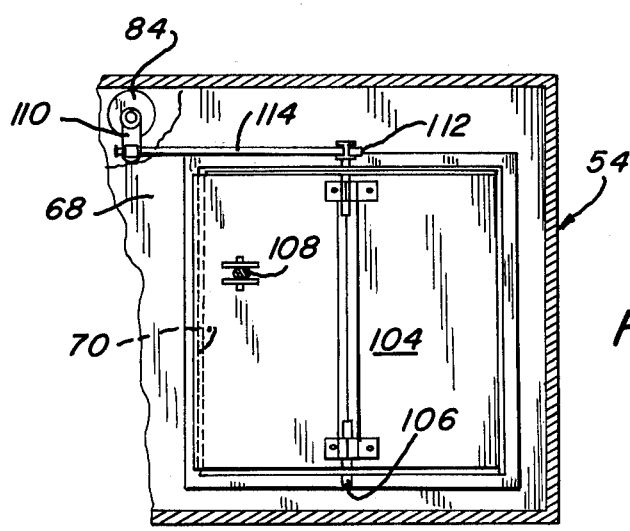
Fig_4

4,129,116

SOLAR AIR FLOW CONTROLLER AND SYSTEM

BACKGROUND OF THE INVENTION

The apparatus of this invention lies in the field of solar energy heating of buildings and the like by heating air in a collector and supplying it to any suitable enclosed space. It is more particularly directed to improved means for handling and directing the flow of air to desired locations with simplicity and reliability.

As a result of the increasing scarcity and cost of conventional energy sources used for heating homes and other buildings many schemes have been proposed for utilizing the heat energy of the sun to provide some or all of the heat needed for the purpose. Some schemes are quite simple and cheap but not very effective and play a minor role in the provision of the required quantity of heat. Other schemes are fairly efficient and some of them provide an adequate amount of heat but entail a very high first cost and involve a large amount of complicated equipment.

Up to the present time the installationn of a solar heating system has been a rather piecemeal operation. The usual system has a heat collector which is located in an exposed area and a rock pile enclosure for storing heat. Ducting connects the two components and automatically controlled blower means circulates air between them. Additional ducting with further blower means connects the collector to the building interior space for transmitting heat to the area of use. Further ducting with blower means connects the heat storage unit with the building interior space to provide heat during the hours of darkness when the collector is not effective. All of these items add up to a complicated and expensive installation which is difficult to coordinate.

SUMMARY OF THE INVENTION

The apparatus of the present invention overcomes the difficulties and disadvantages mentioned above and provides a simple centralized system for accommplishing the three essential heat transfer modes.

Generally stated, the total system includes a building or any other enclosure requiring heating, a heat storage unit which is usually a rock pile in a closed container, a heat collector mounted in a location exposed to the sun, and a single compact controller in the form of a housing containing a blower and its driving motor and provided with three air flow ports for connection to ducting leading to the external components. Within the housing are located flow controlling and directing devices which are adjustable to direct desired flow and block undesired flow. In a typical installation, a first duct section connects the first air flow port to the output side of the collector, a second duct section connects the second air flow port to a first side of the heat storage unit, a third duct section connects the third air flow port to the building or space to be heated, a fourth duct section connects the building to the second side of the storage unit, and a fifth duct section connects the second side of the storage unit to the collector.

To establish a first air transport loop through the blower, building, and storage unit for delivering stored heat to the building in a first heat transfer mode, the controlling devices in the enclosure connect the second air flow port to the blower inlet port and connect the blower outlet port to the third air flow port.

In a second mode, for delivering collector heat to the building, the controlling devices connect the first air flow port to the blower inlet port and connect the blower outlet port to the third air flow port.

In a third mode, for delivering collector heat to the storage unit, the controlling devices connect the first air flow port to the blower inlet port and connect the blower outlet port to the second air flow port.

Thus, a single, compact, combined module provides three mutually exclusive different air transport loops for operation in three heat transfer modes, and requires a minimum of ducting. Any duct which is not in a given loop is blocked off so that air flow follows the desired path. A single actuator control unit may be mounted directly on the housing and connected to appropriate remote censors for completely automatic operation.

BRIEF DESCRIPTION OF THE DRAWINGS

Various other advantages and features of novelty will become apparent as the description proceeds in conjunction with the accompanying drawings, in which:

FIG. 3 is a diagrammatic plan view of the interior of the casing taken on line 3—3 of FIG. 2;

FIG. 4 is an elevational view, partly in section, taken on line 4 of FIG. 3;

DESCRIPTION OF PREFERRED EMBODIMENTS

Figure 1:
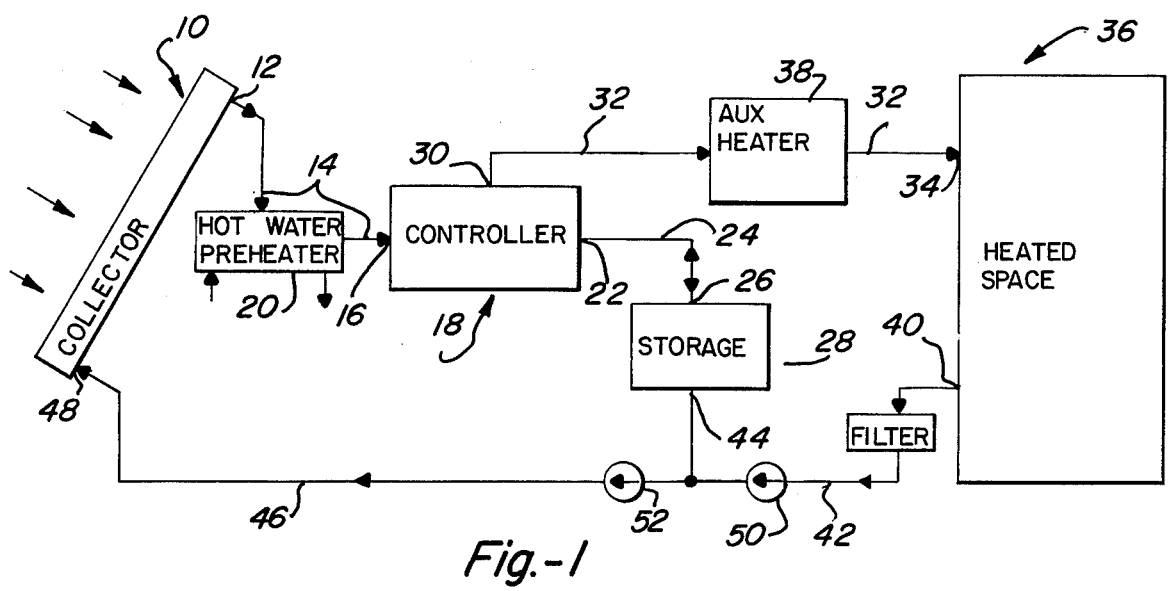
FIG. 1 is a block diagram illustrating the connection and relative arrangement of various components involved in the system.
Figure 5:
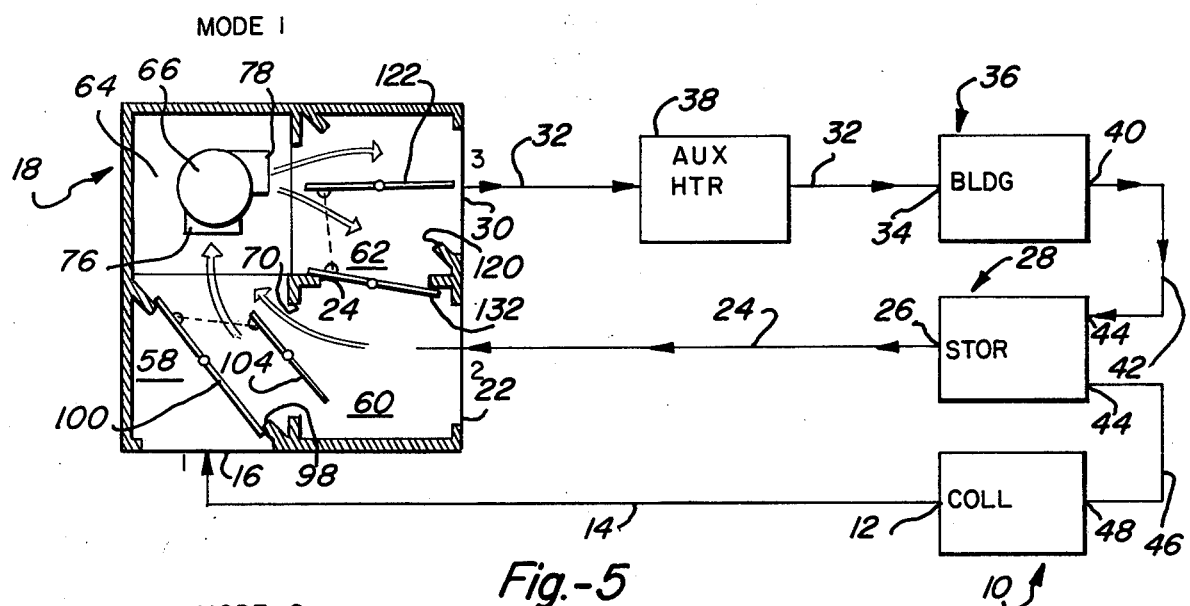
FIG. 5 is a diagrammatic plan view of the controller shown in FIG. 3 connected to other components of the system in a first mode.
Figure 6:
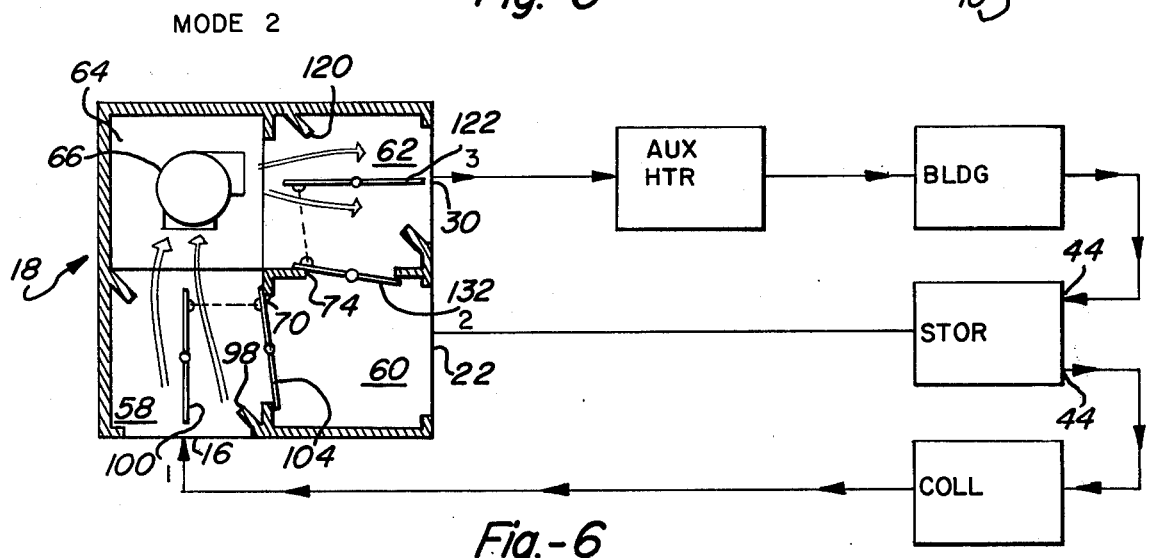
FIG. 6 is a view similar to FIG. 5 showing a second mode.
Figure 7:
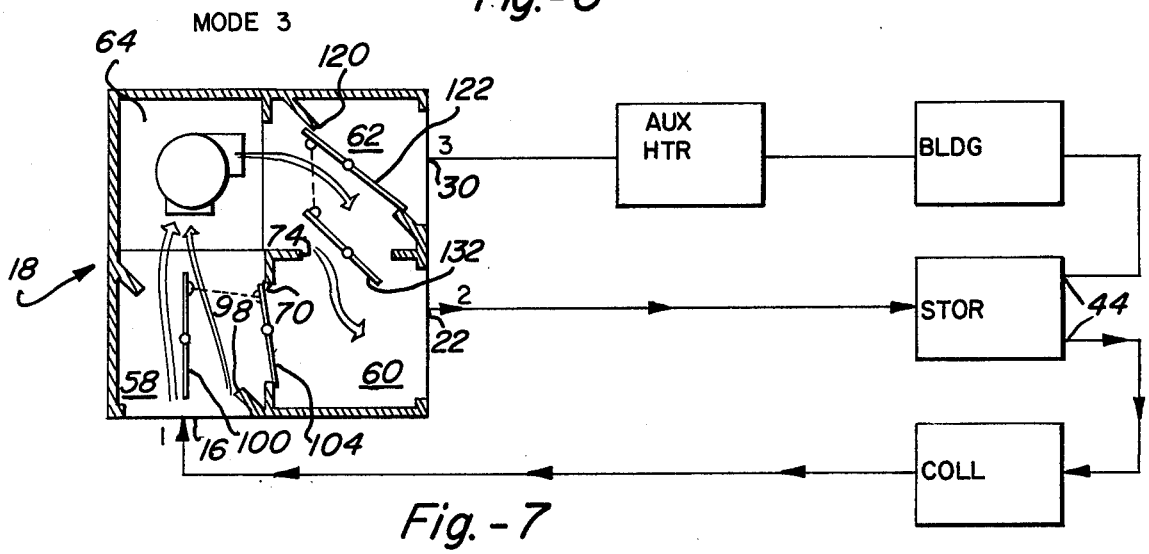
FIG. 7 is a view similar to FIG. 5 showing a third modee.

The general arrangement of a solar heating system incorporating the invention is illustrated in FIG. 1, in which a solar heat collector 10 has an output side 12 which is connected by a first duct section 14 with a first air flow port 16 in flow controller 18. A hot water preheater 20 may be associated with duct section 14. A second air flow port 22 in the controller is connected by a second duct section 24 to port 26 in the heat storage unit 28. A third air flow port 30 in the controller is connected by third duct section 32 to the inlet port 34 of building 36. An auxiliary heater 38 may be incorporated with duct section 32 or connected in parallel with it for use at times when available solar heat from the collector or the storage unit is inadequate. Outlet port 40 of building 36 is connected by fourth duct section 42 to port 44 in the heat storage unit 28. Finally, port 44 is connected by fifth duct section 46 to the input side 48 of collector 10. As here shown, duct sections 42 and 46 share a short common duct portion to port 44. If desired, port 44 may be dual and sections 42 and 46 may have separate paths to separate openings in the port, as shown in FIGS. 5 to 7. Back draft dampers 50 and 52 may be incodporated in duct sections 42 and 46 to prevent undesired reverse flow.

Figure 2:
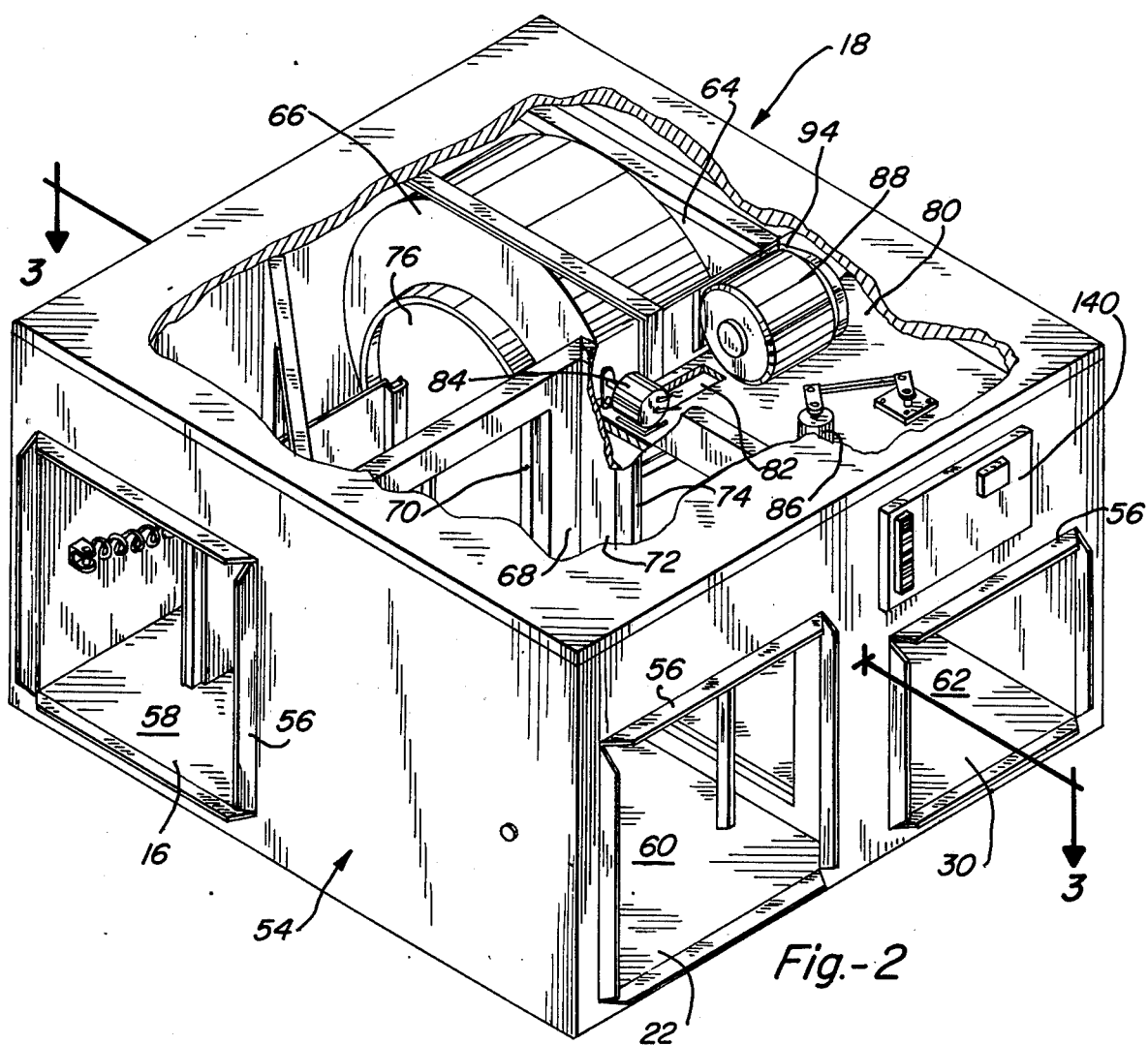
FIG. 2 is a perspective view of the controller casing with parts broken away.

The controller and its principal components are shown in FIGS. 2, 3, and 4. The enclosure or casing 54 is formed of sheet metal, such as steel sheet, and each of the air flow ports 16, 22, and 30 is framed with elongate tabs 56 bent out of the sheet for connection to the duct sections. The inner walls of the casing are lined with insulating and vibration damping material such as particle board. The various walls or partitions within the casing are preferably formed of the same material.

The interior of the casing is divided into a first chamber 58 communicating with port 16, a second chamber 60 communicating with port 22, a third chamber 62 communicating with port 30, and a fourth chamber 64 containing the blower 66. A wall 68 divides the first chamber 58 from the second chamber 60 and is provided with a flow passage 70 for communication between chambers 58 and 60. The passage also provides a seat for engagement by a sealing baffle. A wall 72 divides the second chamber 60 from the third chamber 62 and is provided with a flow passage 74 for communication between chambers 60 and 62. The passage also provides a seat for engagement by a sealing baffle. Blower 66 has an inlet port 76 communicating with chamber 58 and an outlet port 78 communicating with chamber 62.

A partition 80 separates a small upper portion of chamber 62 from the large lower portion to provide a support for the control annd blower motors and is provided with one or more apertures 82. Control motors 84 and 86 and blower motor 88 are mounted on this partition, and motor 88 drives the blower by means of pulleys 90 and 92 and belt 94. A portion of the air from the blower exits above the partition to contact the motors and keep them within satisfactory temperature limits, and then flows out through aperture 82 to add this heat to the flow of heating air.

It will be seen in FIG. 3 that a subdividing wall 96 extends across chamber 58 at an angle of the order of 45 degrees to the direction of air flow from air flow port 16 to blower inlet port 76. The wall is provided with a flow passage 98 which also serves as a seat for sealing baffle 100. The baffle is mounted to the wall by pivot member 102 to swing in the passage between a first position parallel to the air inflow from port 16 and a second position sealingly engaging the wall of passage 98 to block inflow from port 16. A second baffle 104 is mounted to wall 68 by pivot member 106 to swing in passage 70 between a first position sealingly engaging the wall of passage 70 to block communication between the chambers and a second position permitting air flow between them. Linkage 108 connects the baffles in substantial parallelism and constrains them to move in unison. As best seen in FIG. 4, motor 84 is provided with a lever arm 110 and baffle 104 is provided with a lever arm 112, the two arms being connected by link 114. When the motor is actuated in one direction it drives the assemblage to the first position, as shown in FIG. 3, and when it is actuated in the other direction it drives the assemblage to the second position. A tension spring 116 is connected to a wall of the casing and to baffle 100 to yieldingly urge the assemblage toward the second position. The motor remains in power-on condition to hold the baffles in their second position. If the power should fail, the spring 116 moves the baffles to their second position, blocking flow from the collector.

Chamber 62 is similarly provided with an angled subdividing wall 118 having a flow passage 120. Baffle 122 is mounted to wall 118 by pivot member 124 to swing in the passage between a first position in sealing engagement with passage 120 and a second position permitting flow through port 30. It is driven between these positions by control motor 86, lever arms 126 and 128, and link 130. Baffle 132 is mounted to wall 72 by a pivot member 134 to swing in passage 74 between a first position permitting flow through the passage and a second position in sealing engagement with the passage to block flow therethrough. Linkage 136 connects the two baffles to cause them to swing in unison in substantial parallelism. Motor 86 is operated in the same way as motor 84, and when it is in power-off condition spring 138 moves the baffles from their first position, shown in FIG. 3, to their second position, blocking passage 74 and permitting flow through port 30.

The components of the apparatus may be actuated by external controls, manual or automatic, and thermostats, by means of control unit 140, shown on the outer wall of casing 54 in FIG. 2. Suitable sensors may be located where needed to send signals to a comparator in the control unit.

By selective operation of the controller the system may be operated in any one of three basic modes of heat transfer by establishing three different air transport loops.

FIG. 5 illustrates a first mode, in which all of the baffles are swung to their second positions. Baffle 100 blocks port 16. Baffle 104 opens passage 70. Baffle 132 blocks passage 74. Baffle 122 opens passage 120 to permit flow through port 30. Thus the first port is blocked and the second and third ports are clear to establish a transport loop through the blower, the building, and the heat storage unit. This is the mode used on cloudy days or at night when the collector is ineffective. Heat is withdrawn from the storage unit and delivery to the building. If the heat supply runs low the auxiliary heater is activated to make up the difference. The collector is blocked out of the loop so tht it cannot add any cold air. In this mode, the springs hold the baffles in their second positions and power to the control motors is cut off to conserve electricity. Since the winter nights are longer than the day, this is the most desirable arrangement.

FIG. 6 illustrates a second mode, in which baffles 100 and 104 are in their first position and baffles 122 and 132 are in their second position. Baffle 100 permits flow through port 16. Baffle 104 blocks passage 70. Baffles 122 and 132 remain in the previous attitude. Thus, the second port is blocked and the first and third ports are clear to establish a transport loop through the blower, the buiding, and the collector. This is the mode used in normal, cold weather, sunny day operation, the building receiving all of its required heat from the collector.

FIG. 7 illustrates a third mode, in which baffles 100 and 104 remain in their first position and baffles 122 and 132 are swung to their first position. Baffle 100 permits flow through port 16. Baffle 104 blocks passage 70. Baffle 122 blocks passage 120. Baffle 132 opens passage 74. Thus the third port is blocked and the first and second ports are clear to establish a transport loop through the blower, the storage unit, and the collector. This is the mode used when the collector produces more heat than is required by the building, the excess heat being delivered to the storage unit for use when necessary.

It will be noted that when baffle 104 or baffle 132 opens its respective flow passage, baffle 100 and 104 or baffles 122 and 132 cooperate to produce a guide wall and a guide vane for smoothly redirecting the air flow. This is advantageous in the first mode in that the flow path of air creates a force vector as it strikes baffles 100 and 105 tending to hold them in the FIG. 5 position thereby counteracting the negative pressure created by blower 66 which tends to move baffle 100 to the FIG. 6 position. This is true because a greater volume of air will strike the downstream ends of the baffles than will strike the upstream ends so that the force vector about the respective pivots of the baffles will be unequal. This provides a "chimney effect" wherein cold air from the collector could get past baffle 100 and into the building at night when operating in the FIG. 5 mode.

The invention has been described in detail with particular reference to preferred embodiments thereof, but it will be understood that variations and modifications can be effected within the spirit and scope of the invention.

What is claimed is:

1. A unitary flow controller for use in a solar heating system for heating air space within a building comprising:

a blower having an inlet port and an outlet port;

air confining means connected to said inlet and outlet ports of the blower;

said air confining means being in the form of an enclosure for use within a building, said enclosure having walls and provided with first, second, and third air flow ports in said walls for flow communication with first, second, and third air flow ducts;

a plurality of flow control members in the general form of baffles movably connected to the air confining means to control and direct the flow of air through the ports and the blower;

and selectively operable means to adjust the flow control members to three different relative positions to produce three different flow paths through the controller;

a first relative position defining a flow path from the second air flow port to the inlet port of the blower and from the outlet port of the blower to the third air flow port;

a second relative position defining a flow path from the first air flow port to the inlet port of the blower and from the outlet port of the blower to the third air flow port;

and a third relative position defining a flow path from the first air flow port to the inlet port of the blower and from the outlet port of the blower to the second air flow port.

2. A controller as claimed in claim 1; in which the interior of the casing is divided into a first chamber communicating with the first air flow port, a second chamber communicting with the second air flow port, a third chamber communicating with the third air flow port, and a fourth chamber containing the blower;

the first chamber communicates with the inlet port of the blower and with the second chamber;

the third chamber communicates with the outlet port of the blower and with the second chamber;

and the baffles are selectively adjustable to block air flow through each of the ports, between the first and second chambers, and between the second and third chambers.

3. A controller as claimed in claim 2; in which the first and second chambers are divided by a wall formed with a flow passage between them;

and the second and third chambers are divided by a wall formed with a flow passage between them.

4. A controller as claimed in claim 3; in which a third baffle is pivotally mounted in the third chamber and swingable between a first position blocking flow through the third air flow port and a second position permmitting flow through the port;

a fourth baffle is pivotally mounted in the flow passage between the third and second chambers and swingable between a first position permitting air flow through the passage and a second position blocking flow through the passage;

and link means is connected between the baffles to cause them to move in unison between their first and second positions.

5. A controller as claimed in claim 4; in which an electric motor is provided and is linked to one of the baffles to move the pair in unison between their first and second positions;

and spring actuating means is provided and is connected to the baffles to swing them to their second positions when the motor is in power-off condition.

6. A controller as claimed in claim 4; in which the third chamber is subdivided by a wall extending at an angle of the order of 45° to the flow path from the outlet port of the blower to the third air flow port and is formed with a flow passage therethrough;

the third baffle is pivotally mounted in the subdividing wall generally centrally of the flow passage and is substantially parallel to the flow path in its second position and angled in its first position to lie substantially parallel to the subdividing wall and close the flow passage;

annd the two baffles are linked in substantially parallel relation to serve as air flow guides in their first positions.

7. A controller as claimed in claim 3; in which a first baffle is pivotally mounted in the first chamber and swingable between a first position permitting flow through the first air flow port and a second position blocking flow through the port;

a second baffle is pivotally mounted in the flow passage between the first and second chambers and swingable between a first position blocking air flow through the passage and a second position permitting flow through the passage;

and link means is connected between the baffles to cause them to move in unison between their first and second positions.

8. A controller as claimed in claim 7; in which an electric motor is provided and is linked to one of the baffles to move the pair in unison between their first and second positions;

and spring actuating means is provided and is connected to the baffles to swing them to their second positions when the motor is in power-off condition.

9. A controller as claimed in claim 7; in which the first chamber is subdivided by a wall extending at an angle of the order of 45° to the flow path from the first air flow passage therethrough;

the first baffle is pivotally mounted in the subdividing wall generally centrally of the flow passage and is substantially parallel to the flow path in its first position and angled in its second position to lie substantially parallel to the subdividing wall and close to the flow passage;

and the two baffles are linked in substantially parallel to the subdividing eall and close to the flow passage;

and the two baffles are linked in substantially parallel relation to serve as air flow guides in their second positions.

10. A unitary flow controller for use in a solar heating system for heating air space within a building comprising:
- a blower having a single inlet port and a single outlet port;
- air confining means connected to said inlet and outlet ports of the blower;
- said air confining means being in the form of an enclosure for use within a building, said enclosure having walls and provided with first, second, and third air flow ports in said walls for flow communication with first, second, and third air flow ducts;
- a plurality of flow control members movably within said air confining means to control and direct the flow of air through the ports and said blower;
- and selectively operable means to adjust said flow control members to three different relative positions to produce three different manually exclusive flow paths through the controller;
- a first relative position defining a flow path from said second air flow port to said inlet port of the blower and from said outlet port of the blower to said third air flow port;
- a second relative position defining a flow path from said first air flow port to said inlet port of the blower and from said outlet port of the blower to said third air flow port;
- and a third relative position defining a flow path from said first air flow port to said inlet port of the blower and from said outlet port of the blower to said second air flow port.

11. A flow control system for solar heating air within a building comprising:
- a unitary flow controller for use within the building including a housing having walls, a blower within the housing having inlet and outlet ports, and first, second and third air flow ports in the walls of the housing;
- a duct system including a first duct section connected between the first air flow port and the output side of a solar heat collector, a second duct section connected between the second air flow port and a first side of a heat storage unit, a third duct section connected between the third air flow port and a building and the second side of the heat storage unit, and a fifth section connected between the second side of the heat storage unit and the input side of the solar heat collector;
- and selectively operable means within the housing to establish three different flow paths through the controller;
- the first path extending from the second air flow port to the blower inlet port and from the blower outlet port to the third air flow port to complete a flow circuit through the building and the heat storage unit, with the flowing air extracting heat from the storage unit and delivering it to the building;
- the second path extending from the first air flow port to the blower inlet port and from the blower outlet port to the third air flow port to complete a flow circuit through the building and the solar heat collector, with the flowing air extracting heat from the collector and delivering it to the building;
- and the third path extending from the first air flow port to the blower inlet port and from the blower outlet port to the second air flow port to complete a flow circuit through the heat storage unit and the solar heat collector, with the flowing air extracting heat from the collector and delivering it to the heat storage unit.

* * * * *

UNITED STATES PATENT AND TRADEMARK OFFICE
CERTIFICATE OF CORRECTION

PATENT NO. : 4,129,116

DATED : December 12, 1978

INVENTOR(S) : Thomas B. Kent

It is certified that error appears in the above—identified patent and that said Letters Patent is hereby corrected as shown below:

Column 8, line 9, after "building" insert -- to be heated, a fourth duct section connected between the building --.

Signed and Sealed this

Twenty-fourth Day of June 1980

[SEAL]

*Attest:*

SIDNEY A. DIAMOND

*Attesting Officer*   *Commissioner of Patents and Trademarks*